United States Patent [19]

Winitz et al.

[11] 3,856,471

[45] Dec. 24, 1974

[54] AMINO ACID ANALYSIS

[75] Inventors: Milton Winitz, Palo Alto; Jack Graff, Santa Clara, both of Calif.

[73] Assignee: The United States National Aeronautics and Space Administration, Washington, D.C.

[22] Filed: Aug. 5, 1968

[21] Appl. No.: 750,235

[52] U.S. Cl............................ 23/253 R, 23/230 B
[51] Int. Cl....B01d 15/08, G01n 31/08, G01n 33/16
[58] Field of Search............ 23/230, 253; 210/31 C, 210/198 C

[56] References Cited
OTHER PUBLICATIONS

W. H. Stein, J. Biol. Chem. 201, 45–58 (1953).
Heftmann, E., Chromatography, 2nd edn, Reinhold Pub. Co., New York, May 5, 1967. Pages 86, 96, 97 relied on.
Johnson et al., Anal. Chem. 33, number 6, May 1961, 669–673.
Zomzely et al., Anal. Chem. 34, number 11, Oct. 1962, 1414–1417.
Graff et al., Fed. Proc. 22, No. 1, 244 (1963).

Primary Examiner—Robert M. Reese
Attorney, Agent, or Firm—Monte F. Mott; John R. Manning; Leonard Rawicz

[57] ABSTRACT

Process and apparatus for qualitative and quantitative analysis of the amino acid content of a biological sample. The sample is deposited on a cation exchange resin and is then washed with suitable solvents. The amino acids and various cations and organic material with a basic function remain on the resin. The resin is eluted with an acid eluant, and the eluate containing the amino acids is transferred to a reaction vessel where the eluant is removed. The amaino acids are esterified and acylated, and they may then be purified by passage through an anion or cation exchange resin bed. The purified acylated amino acid esters are then transferred to a suitable chromatographic column (e.g., Carbowax as stationary (liquid) phase and diatomaceous silica as solid support) for analysis by gas-liquid chromatographic techniques.

2 Claims, 4 Drawing Figures

AMINO ACID ANALYSIS

The invention described herein was made in the performance of work under a NASA contract and is subject to the provisions of Section 305 of the National Aeronautics and Space Act of 1958, Public Law 85-568 (72 Stat. 435; 42 U.S.C. 2457).

This invention relates to the quantitative and qualitative analysis of biological fluids and, more particularly to the quantitative and qualitative analysis of amino acids contained in biological specimens.

Amino acids are present in varying amounts in almost all plant and animal tissue and fluids. The amount of amino acids present and their relative proportions are generally characteristic of various life forms, and their types and amounts can be disturbed by various pathological conditions. Analysis of the amino acid content of biological material is an important step in general biological research and also can serve as an aid in the diagnosis and treatment of certain pathological conditions, of which malnutrition and metabolic dysfunctions such as phenylketonuria and maple syrup urine disease are prime examples. Analysis of hydrolysates derived from proteins from various sources (e.g., plants, animals, bacteria, yeasts) also provides an indication of the relative quality of the protein and is particularly important from this aspect.

Present methods of analysis of amino acid content of biological fluids and plant and animal protein hydrolysates include the use of paper, ion exchange column and thin layer chomatography, paper electrophoresis, and colorimetric, titrimetric, manometric and enzyme methods. The disadvantages inherent in such conventional physicochemical procedures is that they are lengthy and cumbersome, require expensive equipment and require relatively large samples. For example, for the analysis of amino acids in blood plasma, the presently available standard analytical procedures which employ ion exchange column chromatography generally require a sample of at least several cc., and often a total processing time of approximately a day.

By employing the present invention, simultaneous qualitative and quantitative analyses of the amino acid content of micro and ultramicro biological samples may be rapidly made of the entire sample, for example 0.1 cc. of blood plasma, using relatively inexpensive and simple equipment. Typically, analyses are made using the present invention in a total processing time of less than one hour and upon a sample one or more orders of magnitude smaller than that used in the presently available standard analytical procedures which employ ion exchange column chromatography.

It is an object of the present invention to provide an improved process and apparatus for the simultaneous quantitative and qualitative analysis of the amino acid content of biological samples. It is another object to provide a process and apparatus to enable the quantitative analysis for amino acids present in a complex biological environment to be performed without substantially altering the relative proportions of the amino acids initially present and without introducing substantial errors traceable to the partial or complete degradation of one or more of the individual amino acids initially present or to hydrolysis of proteinaceous material to amino acids. It is a further object to provide a rapid, simple process for producing suitably volatile derivatives of amino acids without measureable loss, which derivatives are readily susceptible to gas-liquid chromatographic analysis. Still another object of the invention is to provide an improved process and apparatus for accurately measuring the amounts of each of the individual amino acids present in complex biological environments containing a large number of amino acids, using only an ultramicro sample.

These and other objects of the invention will be apparent from the following description when read with reference to the accompanying drawings wherein.

Figure 1:
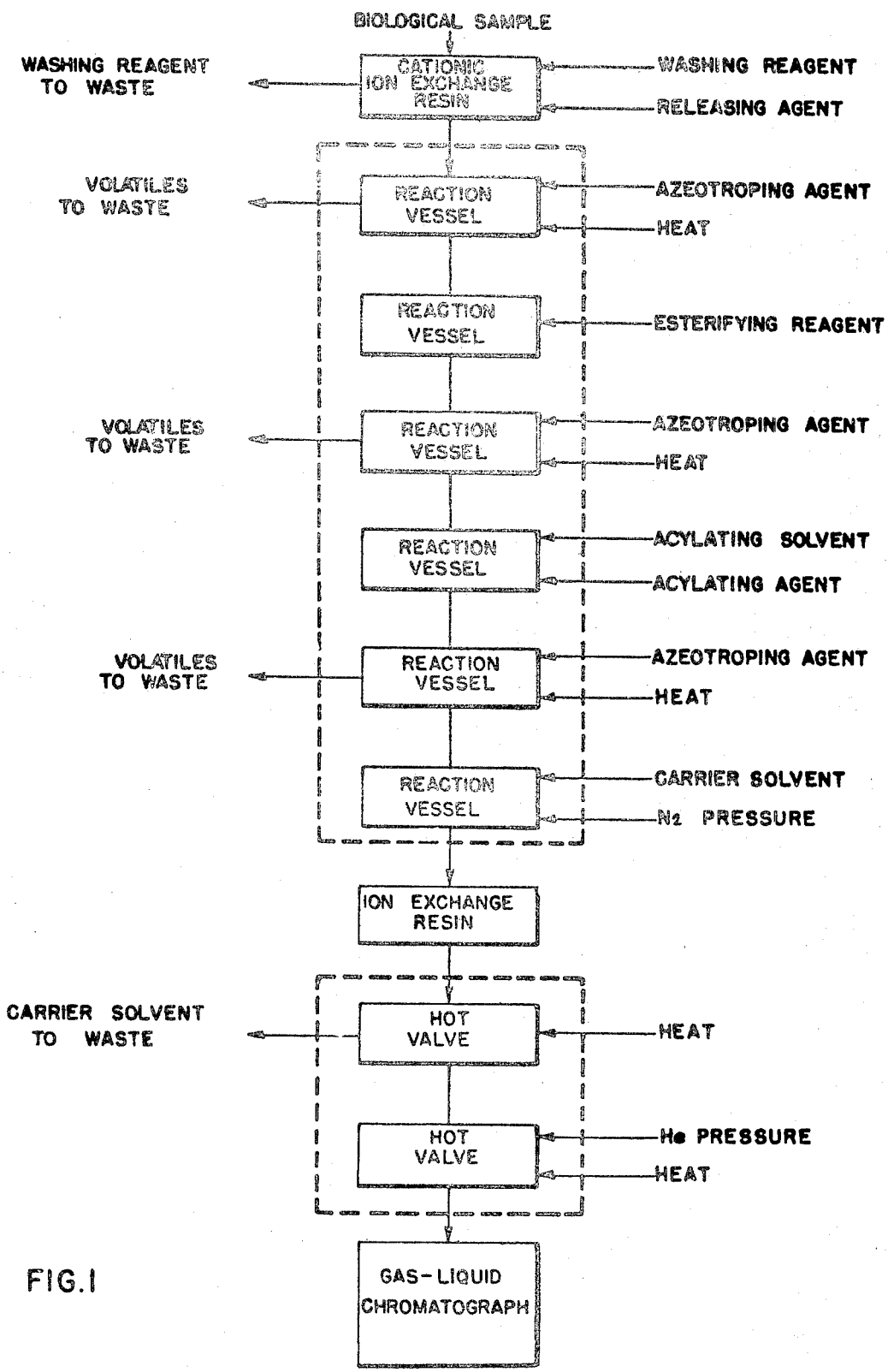
FIG. 1 is a block diagram of the process of the invention.

The general analytical procedure of the invention is hereinafter described with reference to FIG. 1. As shown therein, a known quantity of a biological fluid obtained from a plant protein hydrolysate or from a sample of blood, urine, sweat, feces, tears or homogenates of tissues, e.g., animal pancreas, thymus, spleen or flesh, is deposited upon and adsorbed onto a cation exchange resin. The system operates optimally in the detection of amounts of a given amino acid in the range of $10^{-8}$ to $10^{-12}$ mols in the sample under analysis. Sample sizes may thus be chosen to yield optimal precision, and may vary from as small as 0.1 ml. (as, for example, in blood plasma) to very large samples in which the concentration of amino acids is extremely low. The particular resin used is not critical, and any suitable cation exchange resin that will interact with the amino functional group of the amino acid to adsorb the amino acids on the resin may be used. Sufficient resin is employed to adsorb all the amino acids. An excess of resin is generally used, the preferable adsorbtion function occurring when the ratio of resin to amino acid is milliequivalents is about 10 to 1. Suitable resins include the sulfonic acid base resins, such as Dowex 50. The cation exchange resin is then washed with suitable solvents to carry away from the resin all the constituents of the biological fluid except certain inorganic cations and organic materials having a basic functional group, which are held or chemisorbed on the cation exchange resin. The organic material consists essentially of amino acids with slight amounts of other materials, such as amines and polypeptides.

Care is taken during the wash step to prevent contamination of the sample. A solvent should not be used that would cause hydrolysis of proteinaceous material in the original sample to amino acids. While there are many suitable solvents which can be used, it is preferable to utilize the same alcohol that is employed in the elution and esterification steps to be described hereinafter. By so doing, it is possible to eliminate additional solvent removal steps which might be necessary if another solvent were employed. Preferably water or a water n-propanol mixture is used, followed by n-propanol. Following washing to remove the nonadsorbed ions, the resin is eluted with a suitable solvent to release the adsorbed cations. Although various acidic solvents may be used to elute the resin, it is similarly preferable to use an acidic composition of the alcohol used in the wash step. When n-propanol is the wash solvent, a preferred eluant would be 99:1 n-propanol:$H_2O$ which has been adjusted to 3N with HCl. Basic solvents may also be used, such as n-propanol plus 10 N ammonium hydroxide.

The eluate containing all the amino acids is fed to a reaction vessel and heated to remove the solvent, e.g., n-propanol and $H_2O$, thereby isolating the amino acids in the form of their acid salts and as acid salts of some amino acid esters. Distillation to dryness may be effectively carried out at approximately 100°C. using a purge flow of inert gas and optionally, an azeotropic agent (such as a mixture of n-propanol and benzene). At this point, there has been effected a physical separation of the amino acids from the vast majority of the impurities in the biological fluid, and such a separation has been achieved without contamination of the original sample with amino acids formed from hydrolysis of proteinaceous material in the original sample.

The next step in the process is to form derivatives of the amino acids which are readily susceptible to detection by conventional gas-liquid chromatographic techniques. In this connection, it should be noted that effective quantitative estimation of amino acids by gas-liquid chromatography requires prior conversion of the amino acids in a quantitatively and qualitatively precise and reproducible manner to suitably volatile derivatives.

Preferably, the isolated amino acids are converted to their N-acylamino acid n-alkyl esters. The acyl group of such esters may be formyl, acetyl, propionyl, butyryl and the like. The alkyl group of such esters will normally be methyl, ethyl, propyl or butyl. Most preferably, the acyl group will be acetyl and the alkyl group will be n-propyl, i.e., the derivatives will be N-acetylamino acid n-propyl esters, and the process is hereinafter described with specific reference thereto.

The conversion to the N-acetylamino acid n-propyl esters is performed using a two-step procedure, each of which is conducted in the same reaction vessel into which was fed the eluate containing the amino acid fraction, as described hereinabove.

To accomplish the first stage of the conversion, the dry mixture of amino acids and amino acid esters in the reaction vessel is treated with an esterifying agent, in this case, anhydrous n-propanol-HCl, in the reaction vessel. The anhydrous n-propanol-HCl is prepared by adjusting anhydrous n-propanol to 6 to 8N with anhydrous HCl. The temperature in the reaction chamber is maintained in the range of about 70° – 90°C. until esterification is complete. Following addition of the n-propanol-HCl, the temperature is maintained sufficiently high to evaporate the excess n-propanol reagent with the optional aid of an azeotroping agent (such as n-propanol and benzene). Any water formed in the esterification reaction, as well as excess hydrochloric acid, will also be volatilized during this stage of the procedure, thereby leaving in the reaction vessel a generally dry mixture of the propyl ester forms of the amino acids. It should be noted also that such esters will be in the form of their acid salts, i.e., the hydrochloride salts.

Next, the amino constituent of the amino acids is acylated by the addition of a suitable acylating agent, preferably acetic anhydride. A basic solvent, such as for example pyridine or triethylamine in ethyl acetate solution, is preferably used to expedite the acylation. The acylating agent is preferably used as a mixture of one part acetic anhydride and three parts of pyridine. It is important that during this step the reaction vessel be maintained at about room temperature to prevent the loss of more labile amino acid components. Typically, the contents of the reaction vessel will be permitted to stand for up to five minutes following addition of the acylating agent to permit the reaction to go to completion.

Following completion of the acylating reaction, an appropriate azeotroping agent, such as anhydrous n-propanol in admixture with benzene, is added to the contents of the reaction vessel. The vessel heated to remove excess acylating agent, as well as the azeotroping agent. The use of a solvent or a mixture of solvents which forms an azeotrope with the acylating agent is utilized in order to avoid high temperatures which could volatilize or decompose certain of the low boiling or heat sensitive N-acetyl amino acid n-propyl esters present in the reaction vessel. The azeotropic distillation at this time, it should be noted, does not remove the high boiling pyridine hydrochloride or other organic or inorganic salts (e.g., sodium chloride, triethylamine hydrochloride) which are present during this state with the amino acid esters.

The contents of the reaction vessel are then dissolved in a suitable solvent or mixture of solvents (e.g., ethyl acetate, n-propanol, or a mixture of both). If desired, the solution may be desalted by passage through a suitable desalting exchange resin bed (e.g., an anion exchange resin, a cation exchange resin, or a mixture of both). For example, an anion exchange resin will absorb chloride ion from pyridine hydrochloride, thereby liberating free pyridine which is sufficiently volatile to be removed with the solvent front during the gas-liquid chromatographic procedure, and hence not interfere with the amino acid analysis. Also for example, when an inorganic salt such as sodium chloride is present, both the sodium and chloride ions may be removed through use of a mixed anioncation exchange resin bed to prevent such salts from entering the chromatographic column.

The mixture, which at this stage is principally the N-acetylamine n-propyl esters in a suitable solvent, is either aliquotted to yield a sample size suitable for optimal detection of the amino acid derivatives or used in its entirety for analysis by gas-liquid chromatography.

An optional feature of the process is the incorporation of a hot valve into which the sample is passed prior to its entry into the chromatographic column. This optional step serves the purpose of removing volatile carrier solvents (such as n-propanol, ethyl acetate, etc.) or traces of other volatile impurities before any material is passed onto the chromatographic column. The less volatile N-acetylamino n-propyl esters are then transferred into the column (either by direct injection, or, when the optional hot valve is employed, by a rapid increase in heat).

A conventional gas-liquid chromatograph, such as a Loenco Model 160, equipped with a detection device of suitable sensitivity (e.g., a hydrogen-flame detector) and a suitable recording device, such as a 1 millivolt full-scale recorder with integrator or a digital read-out system (e.g., Infotronics Model CRS-110), can be used to effect the analysis of the amino acid derivatives. Any of the known materials for effecting gas-liquid chromatographic separation can be used according to this invention; however, column employing Carbowax 1450 as the stationary (liquid) phase and Chromosorb-W acid-washed diatamaceous silica (100/120 mesh) as the solid support have been found to be preferred. It has also been found that a much lower amount of Carbowax than is conventionally employed produces a much quicker resolution of the mixture to be analyzed. Whereas it has been usual practice to employ a Carbowax column comprising about 5% Carbowax to 95% inert filler, it is preferable to use a column of from about 0.25% to 1.0% Carbowax. Of course, larger amounts of Carbowax can be employed, but the time required for analysis is increased. A two-foot long stainless steel, aluminum or glass column having an inner diameter between one-eighth inch and one-fourth inch is an example of a suitable column.

A temperature program is also employed according to this invention to decrease the time required for analysis and to improve resolution of the peaks. Thus, immediately after the sample is applied to the Carbowax column, the column temperature is raised at a rate of from 2°C. to 50°C. per minute, and preferably from about 8°C. to 30°C. per minute, from an initial temperature of as low as 25°C. up to a maximum of as high as 250°C. with the preferable range being 90°C. to about 220°C., which upper temperature is then maintained until the analysis is complete. The rate of increase is preferably nonlinear, as explained hereinafter. The above preferred temperature range relates to Carbowax 1450, but if other materials are used, the maximum temperature should be slightly below either the decomposition temperature of the liquid phase of the column or the material being analyzed, whichever is lower.

The above procedure produces rapid and accurate analysis of nearly all the amino acids, except arginine, normally occurring in biological fluids (viz., glycine, alanine, valine, leucine, isoleucine, serine, threonine, proline, hydroxyproline, tryosine, tryptophan, phenylalanine, cysteine, cystine, methionine, aspartic acid, glutamine, asparagine, glutamic acid and lysine).

As can be seen from the above description, the process first effects a separation of the amino acids present in the sample from contaminants present in the original sample without any undesired chemical reaction of the amino acids or contamination thereof with products arising from protein degradation. The chemical reactions required to convert the amino acids to derivatives susceptible to gas-liquid chromatography are conducted after the separation of the amino acids from the major contaminants and are all carried out within a single reaction vessel. Accordingly, the amino acid derivatives produced are substantially free of impurities and are directly proportional both qualitatively and quantitatively to the amino acids present in the original sample. The following specific example illustrates the use of the procedure to analyze first a known sample for calibration purposes and then a biological sample, using the apparatus of FIG. 2.

Figure 2:
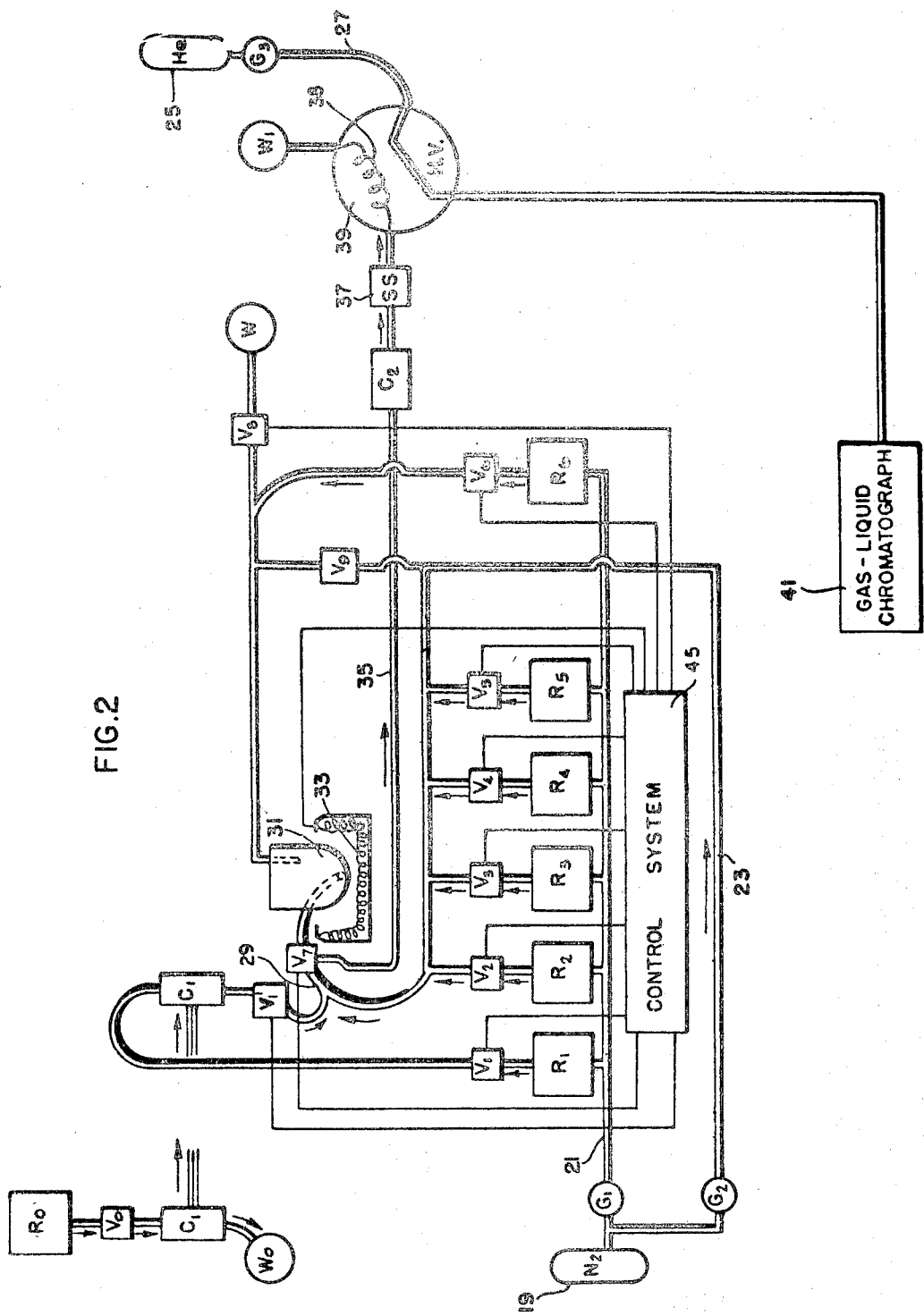
FIG. 2 is a schematic diagram of apparatus embodying various features of the invention.

Referring now to FIG. 2, apparatus for effecting the qualitative and quantitative separation of amino acids from a biological sample and converting the amino acids to the desired N-acylamino acid n-alkyl esters is shown. Typically, seven reagent sources are employed containing reagents $R_0$, $R_1$, $R_2$, $R_3$, $R_4$, $R_5$ and $R_6$, respectively, typically having the following compositions, although other reagents and proportions thereof may be employed, as set forth hereinabove:

| | | |
|---|---|---|
| $R_0$ — | WASHING REAGENT | |
| | n-propanol | 50 parts |
| | distilled water | 50 parts |
| $R_1$ — | RELEASING AGENT | |
| | anhydrous n-propanol-HCl | 98 parts |
| | (HCL about 8N) distilled water | 2 parts |
| $R_2$ — | AZEOTROPING AGENT | |
| | anhydrous n-propanol | 20 parts |
| | benzene | 80 parts |
| $R_3$ — | ESTERIFICATION REAGENT | |
| | anhydrous n-propanol-HCL (HCL about 8N) | 100 parts |
| $R_4$ — | ACYLATING SOLVENT | |
| | pyridine | 100 parts |
| $R_5$ — | ACYLATING AGENT | |
| | acetic anhydride | 100 parts |
| $R_6$ — | CARRIER SOLVENT | |
| | ethyl acetate | 100 parts |

In the analysis apparatus illustrated in FIG. 2, the transfer of chemicals and of the sample being analyzed is generally powered by gas pressure. In the arrangement shown, a cylinder 19 of nitrogen ($N_2$) is provided which is connected via reducing valves $G_1$ and $G_2$ to a reagent pressure line 21 and a purge line 23, respectively. A cylinder 25 of helium (He) is connected via a reducing valve $G_3$ to line 27.

The operation of the apparatus is hereinafter described in detail with reference to a calibration run for the system. A calibration solution is prepared of the following amino acids, each of said acids being present in an amount of 0.004 mole per liter in aqueous solution: glycine, alanine, valine, leucine, isoleucine, serine, threonine, proline, tyrosine, tryptophan, phenylalanine, cysteine, cystine, methionine, aspartic acid, glutamic acid and lysine. From this sample a 1-microliter aliquot is withdrawn (containing $4 \times 10^{-9}$ mols of each amino acid) and is subjected to the entire process delineated in FIG. 1.

For ease of understanding, the analysis operation is described as a series of individual steps which are set forth in their preferred order of performance.

STEP 1:

The one microliter sample is placed on resin cartridge $C_1$, which is then washed thoroughly with reagent $R_0$ which flows through valve $V_0$. The washings pass through cartridge $C_1$ to waste $W_0$.

STEP 2:

The cartridge $C_1$ is moved into the indicated position for elution of the retained materials. The nitrogen pressure is applied to lines 21 and 23 by opening valves $G_1$ and $G_2$, placing the system in the "Ready."

STEP 3:

Two-way valve $V_7$ is set to connect supply line 29 to the reaction vessel 31. Valves $V_1$ and $V'_1$ are opened, valve $V_8$ is opened to waste W, and the releasing agent $R_1$ begins to flow through cartridge $C_1$ into the reaction vessel 31, which is continually being purged with nitrogen from line 23 which connects to supply line 29 leading to valve $V_7$. Step 3 is terminated at a standardized time interval, which is usually about 6 minutes, during which time about 3 ml. of reagent $R_1$ has entered reaction vessel 31. Heater 33 which is associated with reaction vessel 31 is turned on just after the flow of reagent $R_1$ begins and remains on through Step 6.

STEP 4:

Valves $V_1$ and $V'_1$ are closed. Valve $V_2$ is opened causing about 3 ml. of the reagent $R_2$ (azeotroping agent) to be fed into the reaction vessel 31. The volatile contents of the sample in the reaction vessel 31 are distilled to waste, W. Step 4 is terminated at a standardized time interval, which is usually about 5 minutes.

STEP 5:

Valve $V_2$ is closed, and valve $V_3$ is opened causing about 7 ml. of the esterifying reagent $R_3$ to be fed into the reaction vessel 31. When esterification is completed, according to a standardized time interval, usually about 18 minutes, step 5 is terminated.

STEP 6:

Valve $V_3$ is closed and valve $V_2$ is opened to permit about 3 ml. of reagent $R_2$ to enter reaction vessel 31. The volatile contents of the reaction vessel are distilled to waste W by heating to about 100°C. Step 6 is terminated at a standardized time interval, usually about 10 minutes.

STEP 7:

With heater 33 off and valve $V_2$ closed, valve $V_4$ is opened to permit the flow of a time-measured quantity, about 1 ml., pf reagent $R_4$, the acylating solvent. After allowance for sufficient time for the feed of reagent $R_4$, valve $V_4$ is closed and valve $V_5$ is opened to permit the flow of a time-measured quantity (about 0.3 ml.) of reagent $R_5$, the acylating agent. After the standardized time interval for completion of acylation, usually about 2 minutes for a sample this size, step 7 is terminated.

STEP 8:

Valve $V_5$ is closed, valve $V_2$ is opened to permit about 4 ml. of reagent $R_2$ to enter the reaction vessel 31. The volatile contents of the reaction vessel 31 are distilled to waste, W, by energizing the heater 33 and raising the temperature to about 100°C. Step 8 is terminated at a standardized time interval, about 8 minutes, and the heater 33 is turned off.

STEP 9:

Valve $V_5$ is closed, and the mode of two-way valve $V_7$ is reversed to connect the line from the reaction vessel 31 to line 35 which leads to an ion exchange resin cartridge $C_2$. By opening valve $V_6$, the contents of the reaction vessel are dissolved into about 2 ml. of reagent $R_6$ and then transferred to a volumetric flask (not shown) for future direct injection into a gas-liquid chromatograph, or optionally to the resin cartridge $C_2$, by opening valve $V_9$ and applying $N_2$ pressure from line 23.

The following steps 9A through 9C are optional steps which are employed for automatic rather than manual injection of sample into the gas chromatograph.

STEP 9A (Optional): From resin cartridge $C_2$, the whole sample in the carrier solvent is moved by nitrogen pressure into a sample splitter 37. In the sample splitter 37, additional reagent $R_6$ is added to bring the total liquid amount up to a standardized volume, usually 5 ml. The operator may select any desired fraction of the sample (for example, one-tenth or one-thousandth) to pass on to Step 9B and ultimately into the gas chromatograph for analysis. In the present instance, all of the sample is utilized.

STEP 9B (Optional): The sample in the carrier solvent is passed from the sample splitter 37 into a loop 38 of a hot valve 39 which is in the position shown in FIG. 2. In the hot valve, heat is applied to raise the temperature of the contents of the loop 38 to about 80°C., driving the carrier solvent to waste, $W_1$.

STEP 9C (Optional): When all of the carrier solvent has been evaporated, as determined by a vapor-sensing device (not shown), the hot valve 39 is rotated to place the helium supply line 27 in fluid communication with the loop 38 which is itself in fluid communication with the gas-liquid chromatograph 41. Programmed heat from (about 90° to 225°C.) is applied, and the acylated amino acid esters are volatilized onto the chromatographic column for analysis.

STEP 10:

Temperature-programmed gas-liquid chromatographic analysis is performed on the sample. The column employed is 2 feet long, ⅜ in. in diameter and contains about 0.5 percent Carbowax 1450 on a 100 mesh diatamaceous silica base. The operation of the column is such that the column is initially at about 90°C. and the rate of temperature rise is maintained at about 12°C. per minute until a temperature of 165°C. is reached. At this time the rate of temperature rise is increased to about 25°–30°C. per minute for about 2–3 minutes until a maximum temperature of about 220 to 225°C. whereat the temperature is maintained for the rest of the analysis. The total elapsed time for a run of one biological sample from the time of initial injection until the recorder curve is finished is about 80 minutes. The digital print-out detector response which is obtained using an Infotronics Model CRS–110 recorder system is shown in TABLE I below. This table hereafter serves as a calibration chart for the overall analyzer system because the quantity of each amino acid present initially in the calibration solution was known.

TABLE I

CALIBRATION CHART

| Amino Acid | Amount (known) Mols | Digital Print-out from Recorder | | Calculated Specific Response (Area per $10^{-9}$ mols) |
|---|---|---|---|---|
| | | Retention Time (sec) | Response (Area) | |
| Alanine | $4 \times 10^{-9}$ | 40 | 2203 | 550.8 |
| Valine | do. | 49 | 3298 | 824.5 |
| Isoleucine | do. | 71 | 4173 | 1043.3 |
| Leucine | do. | 81 | 4135 | 1033.8 |
| Proline | do. | 124 | 3095 | 773.8 |
| Threonine | do. | 169 | 3148 | 787.0 |
| Serine | do. | 224 | 2593 | 648.3 |
| Aspartic acid | do. | 275 | 3402 | 850.5 |
| Methionine | do. | 299 | 3298 | 824.5 |
| Cysteine | do. | 322 | 2036 | 509.0 |
| Phenylalanine | do. | 336 | 4406 | 1101.5 |
| Glutamic acid | do. | 360 | 4150 | 1037.5 |
| Tyrosine | do. | 510 | 1855 | 463.8 |
| Lysine | do. | 566 | 2855 | 716.3 |
| Tryptophan | do. | 668 | 1552 | 388.0 |

To illustrate the analysis of a biological sample, a solution containing a 10 microgram portion of casein of unknown composition, in the form of its hydrolysate, is initially deposited upon the cartridge $C_1$ and treated exactly as described above with regard to Steps 1 to 10. The procedure results in the digital print-out shown in TABLE II below.

likewise be understood that for biological samples containing other amino acids having different degrees of volatility, it may be desirable to use columns of different length or different composition or to use a different temperature program; however, these adjustments are well within the skill of the art to one familiar with the invention.

TABLE II

ANALYSIS OF CASEIN HYDROLYSATE SAMPLE

| Amino Acid | Digital Print-out from Recorder | | Specific Response per $10^{-9}$ mols (from Table I) | Amount in Sample (calc.) |
|---|---|---|---|---|
| | Retention Time(Sec.) | Response (Area) | | |
| Alanine | 38 | 2104 | 550.8 | $3.82 \times 10^{-9}$ mols |
| Valine | 46 | 5211 | 824.5 | 6.32 do. |
| Isoleucine | 69 | 5248 | 1043.3 | 5.03 do. |
| Leucine | 82 | 7878 | 1033.8 | 7.62 do. |
| Proline | 125 | 7862 | 773.8 | 10.16 do. |
| Threonine | 173 | 2841 | 787.0 | 3.61 do. |
| Serine | 225 | 3664 | 648.3 | 5.65 do. |
| Aspartic acid | 277 | 4729 | 850.5 | 5.56 do. |
| Methionine | 303 | 1715 | 824.5 | 2.08 do. |
| Cysteine | 326 | 168 | 509.0 | 0.33 do. |
| Phenylalanine | 340 | 3602 | 1101.5 | 3.27 do. |
| Glutamic acid | 365 | 16289 | 1037.5 | 15.70 do. |
| Tyrosine | 520 | 1484 | 463.8 | 3.20 do. |
| Lysine | 582 | 3921 | 716.8 | 5.47 do. |

From a comparison with the calibration chart of TABLE I, it is determined that the amino acid composition of the casein sample treated is as set forth in the last column of TABLE II. Expressed in the more conventional terms of grams of amino acid per 100 grams of protein, the casein sample analysis is as follows:

| AMINO ACID | COMPOSITION(gm./100gm. protein) |
|---|---|
| Alanine | 3.4 |
| Valine | 7.4 |
| Isoleucine | 6.6 |
| Leucine | 10.0 |
| Proline | 11.7 |
| Threonine | 4.3 |
| Serine | 6.0 |
| Aspartic acid | 7.4 |
| Methionine | 3.1 |
| Cysteine-cystine | 0.4 |
| Phenylalanine | 5.4 |
| Glutamic acid | 23.1 |
| Tyrosine | 5.8 |
| Lysine | 8.0 |

It will be understood that although the equipment may be manually operated, it is preferable that the sequence and timing of the operation of the valves and the times and temperatures of reaction in the reactors be controlled by automatic timing and sequencing apparatus 45 which is not shown in detail and, which in its specific detail forms no part of this invention. Suitable automatic control apparatus to operate the illustrated system are commercially available at the present time.

Although the foregoing illustrative calibration run and analysis example were directed particularly to the protein amino acids, as previously indicated, the invention is applicable to amino acids in general. It should Various of the features of the invention are set forth in the claims which follow.

What is claimed is:

1. Apparatus for qualitatively and quantitatively determining the amino acid contents of a sample, which apparatus comprises:

a reaction vessel for holding a group of amino acids from a sample, means for supplying to said vessel in serial order (a) an azeotroping agent, (b) an esterifying reagent, and (c) azeotroping agent to convert said amino acids to the N-acyl amino acid alkyl ester derivatives thereof, means for heating said reaction vessel to remove solvents and water, means for supplying to said vessel a carrier solvent for said entire N-acyl amino acid alkyl ester mixture, heating chamber means to which said mixture is transferred from said reaction vessel, means for connecting said chamber means to waste while said carrier solvent is vaporized, means for thereafter connecting said chamber means to the inlet of a gas chromatographic device and to a source of carrier gas for transferring said amino acid derivatives thereto in the gaseous state, and a control device connected to each of said above-mentioned means for automatically effecting sequential timed operation of each of said above-mentioned means.

2. Apparatus in accordance with claim 1 wherein a gas-liquid chromatographic device is provided having a column containing between about 0.25% and 1% Carbowax as the stationary liquid phase, based upon total weight of Carbowax and inert filler.

* * * * *